United States Patent

Ching et al.

[11] Patent Number: 5,864,611
[45] Date of Patent: Jan. 26, 1999

[54] SYSTEM AND METHOD FOR ESTIMATING TRAFFIC RATES

[75] Inventors: Chee Ching, Freehold; Salomon Leo Ehrenreich, Middletown; Muralidharan Kodialam, Edison; Donald Jay Mintz, Fair Haven, all of N.J.

[73] Assignee: AT&T Corp., Middletown, N.J.

[21] Appl. No.: 927,132

[22] Filed: Sep. 2, 1997

[51] Int. Cl.$^6$ .................................................. H04M 15/00
[52] U.S. Cl. ........................... 379/134; 379/113; 379/243
[58] Field of Search ............................. 349/34, 112, 113, 349/133, 134, 137, 219, 220, 221, 243, 244

[56] References Cited

U.S. PATENT DOCUMENTS

| | | | |
|---|---|---|---|
| 4,456,788 | 6/1984 | Kline et al. .............................. | 379/137 |
| 5,226,075 | 7/1993 | Funk et al. .............................. | 379/243 |
| 5,450,483 | 9/1995 | Williams .................................. | 379/279 |
| 5,537,611 | 7/1996 | Rajagopal ................................ | 379/221 |
| 5,809,491 | 9/1998 | Kayalioglu et al. ..................... | 379/134 |

*Primary Examiner*—Paul Loomis

[57] ABSTRACT

A system and method for estimating the traffic rates of large traffic sources is provided. A class of a most recently selected address is compared to the contents of a register. If the class is the same as the contents of the register, a first counter is incremented; otherwise, the class is loaded into the register and the first counter is initialized. A class of a new most recently selected address is then obtained and the above process repeated. If the count of the first counter reaches a predetermined threshold, a threshold counter associated with the class is incremented and the first counter and register are reset. A different threshold counter is associated with each different class. After a predetermined time period, the traffic rate for a class may be computed from the count of the threshold counter associated with the class.

16 Claims, 2 Drawing Sheets

SYSTEM AND METHOD FOR ESTIMATING TRAFFIC RATES

BACKGROUND OF THE INVENTION

This invention relates to estimating traffic rates, and more particularly to estimating the traffic rates of large traffic sources.

Within the long-distance telephone industry, an ever present need exists to accurately track telephone call traffic rates (hereinafter "traffic rates"). A knowledge of accurate traffic rates allows a network operations center or other monitoring facility to balance calling loads among different databases within a network so that network overloading may be reduced. Reduced network overloading in turn improves overall network performance as network overloading not only degrades throughput at a specific network element, but also stresses the signaling network, databases, switches, and trunking network all at the same time.

A network operations center may, for instance, use traffic rate information to predict/manage mass calling events. A mass calling event occurs when a single customer generates abnormally high network traffic (such as during a radio or television promotion) which threatens to overload the network. Accurate and timely traffic rate estimates assist a network operations center in predicting and eradicating these types of overloads through rapid isolation of the traffic source responsible for the mass calling event.

Traffic rate information may also be used for general network overload management. Typically a list of the largest traffic sources in a network (e.g., the traffic sources which need controlling during a network overload) is compiled so that overloads may be rapidly eliminated by rerouting the traffic sources on the list. Accurate traffic rate information ensures that only the proper (e.g., largest) sources are listed and controlled during an overload condition.

Traffic rate information is also required for other network management functions. For example, during database partitioning, decisions must be made regarding which traffic sources can share databases without creating overload conditions. Accurate traffic rate information improves these type of resource allotment decisions.

Traffic rate measurements are typically performed at several locations within a telephone network, and are categorized by a "class" associated with each telephone number (i.e., a particular 800 number, database, or other attribute associated with the telephone number, including the telephone number itself). Conventional methods for traffic rate estimation sample only a small percentage (e.g., 5%) of network telephone calls. Upon sampling a dialed telephone number, a table is searched to identify whether the class associated with the sampled telephone number has been previously identified. If so, a count associated with the class is incremented; otherwise the class is added to the table. Based on the count for each class within the table during a known time period, an estimation of the traffic rate for each class may be determined.

Because the table must be searched and updated for every telephone number sampled, such estimation schemes are real-time intensive, requiring substantial computing resources. This is the very reason why only a small percentage of network calls are sampled. By sampling infrequently, the number of database searches required during traffic rate estimation is reduced. Infrequent sampling, however, also reduces estimation accuracy unless a large number of samples are taken (which further consumes time and processing power). Accuracy must therefore be balanced with speed in these type of sampling configurations.

Furthermore, because of the random nature of such sampling, statistics are maintained on small traffic sources (which have little impact on network management decisions) as well as on large traffic sources (which govern nearly all network management decisions). This greatly increases the size of the database used to store class statistics, and the number of classes which must be searched following each sampling.

A need therefore exists for a system and method for accurately estimating traffic rates without requiring extensive real-time database searching. Such a system and method will improve telephone network performance by allowing a network operations center to quickly and accurately balance calling loads among different databases and to make better informed network management decisions. More generally, such a system and method can be employed for traffic rate estimation during any addressing event (e.g., for determining computer network traffic rates, data bus traffic rates, and the like).

It is therefore an object of this invention to provide an improved system and method for estimating traffic rates.

SUMMARY OF THE INVENTION

These and other objects of the invention are accomplished in accordance with the principles of the invention by providing a system and method for estimating the traffic rates of large traffic sources. A class of a most recently selected address (e.g., a class of a most recently dialed telephone number) is compared to the contents of a register. If the class of the most recently selected address is the same as the contents stored in the register, a first counter is incremented. However, if the class of the most recently selected address is not the same as the contents stored in the register, the class of the most recently selected address is loaded into the register and the first counter is initialized (e.g., set to one). A class of a new most recently selected address is then obtained and the above process is repeated. In this manner, the first counter counts the number of times the same class is consecutively selected. If this number reaches a predetermined count threshold K (i.e., if the first counter's count equals or exceeds the count threshold K) then a threshold counter (hereinafter "a K counter") associated with the class is incremented and the register and the first counter are reset (e.g., set to zero).

A different K counter is assigned to each different class. Accordingly, a class's K counter is incremented each time the class is consecutively selected K times. At any given instant, the count of a class's K counter may be examined to obtain an estimate of the traffic rate for that class. Such traffic rate information may then be used by a network operations center to balance calling loads among different databases within the network or for other network functions as previously described.

Further features of the invention, its nature and various advantages, will be more apparent from the accompanying drawings and the following detailed description of the preferred embodiments.

DETAILED DESCRIPTION OF THE PREFERRED EMBODIMENTS

Figure 1:
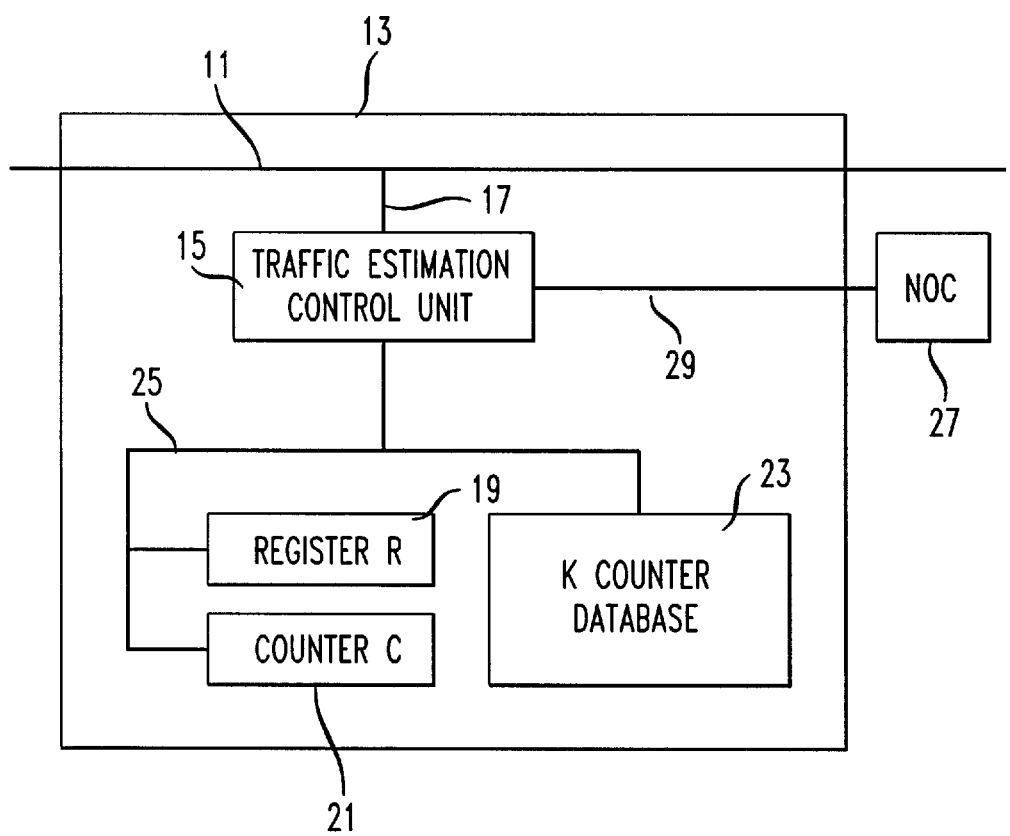
FIG. 1 is a block diagram of an illustrative apparatus which can operate in accordance with this invention.

In the illustrative embodiment shown in FIG. 1, a plurality of routing lines 11 are operatively coupled to a telephone network node 13. Routing lines 11 may, for example, comprise coaxial cables, optical fiber bundles, or microwave links, and network node 13 may comprise a trunk exchange switch node, a local exchange switch node, a special service switch node, some form of mobile telecommunications network, or the like. Further contained within network node 13 is hardware used in a preferred embodiment of the present invention; namely, a traffic estimation control unit 15 (hereinafter "TE control unit 15") operatively coupled to routing lines 11 via a plurality of query bus lines 17 (hereinafter "query bus 17") and further operatively coupled to a register 19 (register R), a first counter 21 (counter C), and a K counter database 23 via a control bus 25. TE control unit 15 is also operatively coupled to a Network Operations Center 27 through a traffic rate bus 29. It will be understood that these examples are only illustrative, and that many other configurations for routing lines 11, network node 13, and the TE hardware (i.e., TE control unit 15, register 19, first counter 21, and K counter database 23) are possible.

In operation, to initiate traffic rate estimation, TE control unit 15 resets register 19, first counter 21, and K counter database 23 to zero (though any initial values may be used). Preferably K counter database 23 is emptied of all class information so that classes must be added to K counter database 23 during data collection as described below. Subsequently, by means of query bus 17, TE control unit 15 queries routing lines 11 to obtain, among other things, the class associated with the most recently dialed telephone number (hereinafter "MRDC") present at network node 13. If the MRDC is equal to the contents of register 19, first counter 21 is incremented; otherwise, the MRDC is loaded into register 19 and first counter 21 is initialized (e.g., set to one). These steps are repeated continuously: TE control unit 15 queries routing lines 11 to get a MRDC, compares this MRDC to the contents of register 19, and either increments first counter 21 if the MRDC equals the contents of register 19 or loads register 19 with the MRDC and initializes first counter 21 if the MRDC is different from the contents of register 19. In this manner, first counter 21 counts the number of consecutive times (i.e., the number of times in a row) a telephone number with the same class is received by network node 13.

Additionally, TE control unit 15 monitors the count of first counter 21 to determine if it equals or exceeds a predetermined count threshold K. If so, TE control unit 15 searches K counter database 23 for the MRDC. If the MRDC is found within K counter database 23, a K counter (not shown) associated with (e.g., assigned to) the MRDC is incremented so as to keep track of the number of times that a telephone number with that class has been received K times in a row by network node 13. Otherwise, if the MRDC is not found within K counter database 23, the MRDC is added to the list of classes in K counter database 23, and a K counter is associated with the MRDC and initialized. The contents of register 19 and first counter 21 are then reset and TE control unit 15 returns to querying routing lines 11 for new MRDCs. (It will be understood that while registers and counters are reset to zero and initialized to one in a preferred embodiment, other reset and initialized values may be used.)

The selection of count threshold K depends on many factors. For instance, if K is a large number, only very large traffic sources will have sufficient calling volumes to produce the same class K times in a row at network node 13. Accordingly, few database searches will be required for traffic rate estimation, and K counter database 23 will remain small (containing only a few classes for the largest traffic sources in the network). Accurate information will only be provided regarding very large traffic sources, and the noise level of the traffic rate data will be high (unless measurement time is increased so that more entries are made to K counter database 23). On the other hand, if K is a small number, information about a larger number of traffic sources will be recorded, requiring many more database searches through a larger database. However, measurement time may be reduced as many entries will be made to K counter database 23 within a short time period. Therefore, when selecting the value for count threshold K, a balance must be struck between the number of traffic sources studied, the number of database searches made, database size, and the accuracy of the traffic rate data.

Once traffic rate data has been collected, TE control unit 15 may examine the contents of K counter database 23 to determine the count of each class's K counter. With this information, an estimate of the traffic rate of each class in the database may be made. The estimated probability $p_i$ that the next most recently dialed telephone number will be a class i number is an inverse function of the arrival rate $\lambda$ of calls to network node 13 (assumed to be a constant) and the number of times $N_K(i,T)$ within a time period T that a telephone number with a class i was detected K times in a row:

$$p_i f^{-1} \left( \frac{N_k(i, T)}{\lambda T} \right)$$

In general, $p_i$ may be computed iteratively for an arbitrary count threshold value K via the formula (assuming a boundary condition of $\phi_0 = 0$):

$$\phi_{j+1} \left[ \frac{N_K(i, T)(1\phi_j^K)}{\lambda T(1\phi_j)} \right]^{\frac{1}{K}} j0, 1, 2 \ldots$$

The iteration is stopped and pi equated to $\phi_{n+1}$ when the following condition has been satisfied (where E is a pre-specified tolerable error value):

$$|\phi_{n+1}\phi_n| < \in$$

For the special case wherein count threshold K equals 2, a closed form solution for $p_i$ can be derived:

$$p_i \frac{1}{2} \left( \frac{N_2(i, T)}{\lambda T} \sqrt{4 \left( \frac{N_2(i, T)}{\lambda T} \right) \left( \frac{N_2(i, T)}{\lambda T} \right)^2} \right)$$

A significant advantage of the present invention is that K counter database 23 need not be searched for each telephone number sampled. K counter database 23 is only searched when a telephone number with the same class is dialed at least K times in a row. Similarly, a class is only added to K counter database 23 if a telephone number with the same class has been dialed K times consecutively. In this manner, both the number of required database searches and database size are significantly reduced such that real-time computing requirements are also reduced. Additionally, only large traffic sources (the sources of primary interest for network management) are examined, with most small traffic sources (e.g., traffic sources incapable of producing, at network node 13, K calls in a row with the same class) being ignored.

Figure 2:
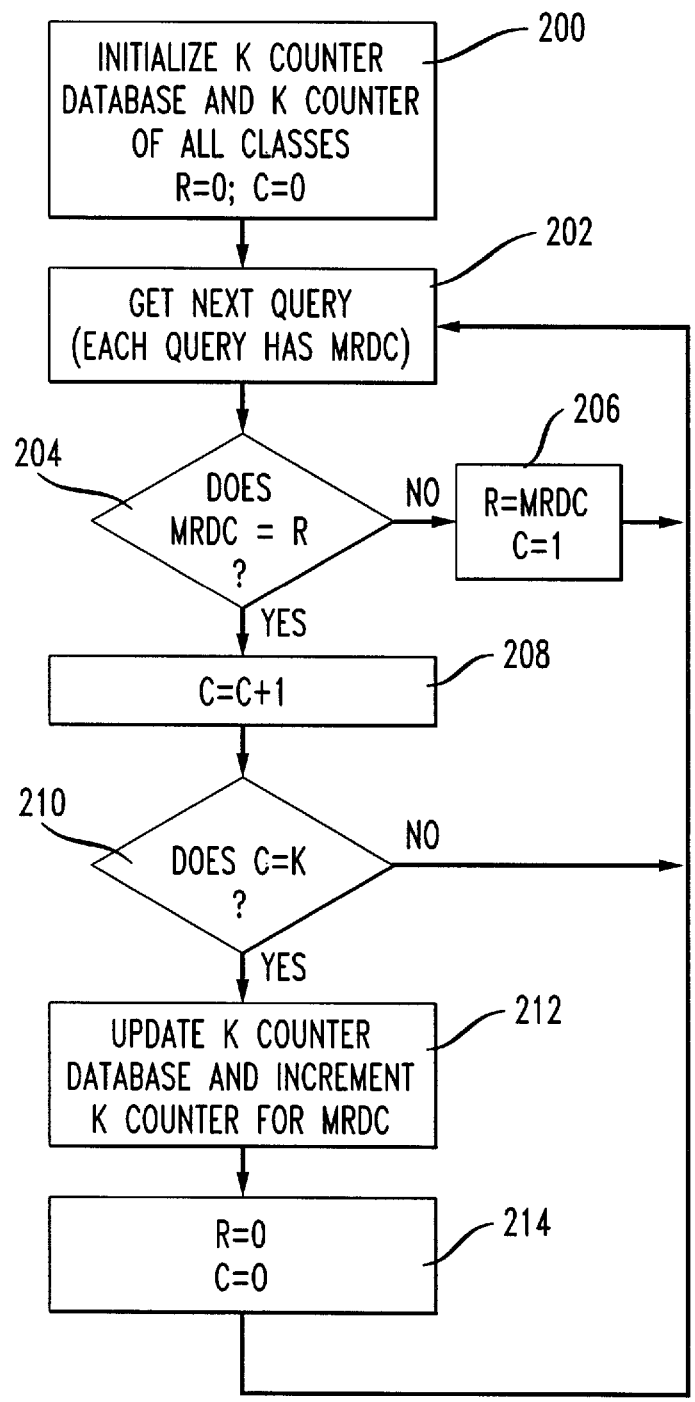
FIG. 2 is a flow chart useful in describing the operation of an illustrative embodiment of the invention.

FIG. 2 shows an illustrative sequence of steps in accordance with the invention for operating the apparatus of FIG. 1 as described above or, more generally, for use in a software embodiment of the present invention. To some extent these steps have already been mentioned and the discussion of them here can be somewhat abbreviated.

In step 200 register R and counter C are reset. Register R may, for example, be equivalent to register 19 of FIG. 1, while counter C may be equivalent to first counter 21. Normally R and C are reset to zero, though other starting values may be used. The K counter database (e.g., K counter database 23) is also emptied of all class information. Control then passes to step 202.

In step 202 a query is made to determine the MRDC present at the network node. This class may be the telephone number itself or some attribute associated with the telephone number. Control then passes to step 204.

In step 204 the contents of register R are compared to the MRDC. If the MRDC is the same as the contents of register R, then control passes to step 208 (described below); otherwise control passes to step 206 wherein the MRDC is stored in register R, counter C is initialized (e.g., set to one), and control passes back to step 202 wherein a new MRDC is obtained and the above mentioned steps are repeated.

In step 208 (recalling that control passed to step 208 when, in step 204, the MRDC was found to be the same as the contents of register R) counter C is incremented (e.g., increased by one), indicating that the MRDC is the same class as is contained in register R. Control then passes to step 210.

In step 210, counter C is compared to a count threshold K. If counter C's count is less than count threshold K, control passes to step 202; otherwise, control passes to step 212.

In step 212, the K counter database is searched for the MRDC. If the MRDC is found within the K counter database, a K counter associated with the MRDC is incremented so as to keep track of the number of times a telephone number with the same class has been received K times in a row. Otherwise, the MRDC is added to the list of classes in the K counter database, and a K counter is associated with the MRDC and initialized. A separate K counter is maintained for each different class within the K counter database. Following step 212, control is passed to step 214.

In step 214, register R and counter C are reset (e.g., set to zero) and control is passed to step 202.

At any point within the sequence of steps depicted in FIG. 2, a traffic rate estimation for a class may be computed from the K counter data for the class (stored in the K counter database) as previously described.

It will be understood that the foregoing is only illustrative of the principles of the invention and that various modifications can be made by those skilled in the art without departing from the scope and spirit of the invention. For example, the invention can be used at any type of network switching node. Furthermore, while the term "traffic rate" has been used herein interchangeably with "telephone call traffic rate," it will be understood that the present invention may be employed to measure the traffic rate of any similar addressing event (e.g., computer network traffic rates, data bus traffic rates, the rate of addressing events associated with the INTERNET or the WORLD WIDE WEB, and the like). Similarly, outside the telephone traffic rate context, "class" may refer to any attribute associated with an addressing event. Furthermore, the invention may be used with any type of register R and counter C and may be embodied in hardware, software, or any combination thereof.

The invention claimed is:

1. A method for estimating traffic rates comprising:

obtaining a class of a most recently selected address;

comparing said class to the contents of a storage element;

incrementing a counting element if said class is equal to said contents of said storage element, otherwise initializing said counting element and loading said storage element with said class; and determining if said counting element equals a predetermined threshold, and if so, incrementing a threshold counter associated with said class.

2. The method defined in claim 1 wherein said selected address is a dialed telephone number and said class is a class of said dialed telephone number.

3. The method defined in claim 1 further comprising:

resetting said counting element following the incrementing of said threshold counter.

4. The method defined in claim 1 further comprising:

resetting said storage element following the incrementing of said threshold counter.

5. The method defined in claim 1 further comprising:

resetting said storage element and said counting element prior to obtaining said class of said most recently selected address.

6. The method defined in claim 1 further comprising:

providing a monitoring station with the count of said threshold counter.

7. The method defined in claim 6 further comprising:

providing said monitoring station with the identity of said class associated with said threshold counter.

8. The method defined in claim 1 further comprising:

estimating the traffic rate of said class from the count of said threshold counter associated with said class.

9. The method defined in claim 1 further comprising:

repeating the method of claim 1 for a predetermined time period.

10. An apparatus for estimating traffic rates comprising:

a counter;

a register; and a controller for determining whether the contents of said register are equal to a class of a most recently selected address, and if so, causing said counter to increment, otherwise initializing said counter and causing said register to store said class, said controller also for determining whether said counter has reached a predetermined threshold, and if so, incrementing a threshold counter associated with said class.

11. The apparatus defined in claim 10 wherein said selected address is a dialed telephone number, and said class is a class of said dialed telephone number.

12. The apparatus defined in claim 10 wherein said controller is also for resetting said counter following said threshold counter being incremented.

13. The apparatus defined in claim 10 wherein said controller is also for resetting said register following said threshold counter being incremented.

14. The apparatus defined in claim 10 further comprising a monitoring station for monitoring the count of said threshold counter.

15. The apparatus defined in claim 14 wherein said monitoring station is also for monitoring the identity of said class associated with said threshold counter.

16. The apparatus defined in claim 10 further comprising:

a database for storing said threshold count associated with said class.

* * * * *